US012577424B2

(12) United States Patent
Wu et al.

(10) Patent No.: US 12,577,424 B2
(45) Date of Patent: Mar. 17, 2026

(54) TWO-COMPONENT AQUEOUS SEALING PRIMER FOR WOOD SUBSTRATE, SEALING COATING FORMED THEREOF AND ARTICLE

(71) Applicant: Sherwin-Williams (Guangdong) New Material Co., Ltd., Foshan City (CN)

(72) Inventors: Sai Wu, Foshan City (CN); Zhenlin Lu, Foshan City (CN); Yu Zhou, Shanghai (CN)

(73) Assignee: SHERWIN-WILLIAMS (GUANGDONG) NEW MATERIAL CO., LTD., Guangdong (CN)

( * ) Notice: Subject to any disclaimer, the term of this patent is extended or adjusted under 35 U.S.C. 154(b) by 0 days.

(21) Appl. No.: 17/740,553

(22) Filed: May 10, 2022

(65) Prior Publication Data

US 2022/0380619 A1 Dec. 1, 2022

(30) Foreign Application Priority Data

May 28, 2021 (CN) .......................... 202110592326.8

(51) Int. Cl.
| | |
|---|---|
| *C09D 7/20* | (2018.01) |
| *C09D 5/00* | (2006.01) |
| *C09D 5/02* | (2006.01) |
| *C09D 15/00* | (2006.01) |
| *C09D 133/04* | (2006.01) |

(52) U.S. Cl.
CPC ............. C09D 15/00 (2013.01); C09D 5/002 (2013.01); C09D 5/022 (2013.01); C09D 7/20 (2018.01); C09D 133/04 (2013.01)

(58) Field of Classification Search
CPC ........ C09D 15/00; C09D 5/002; C09D 5/022; C09D 7/20; C09D 133/04; C09D 5/00; C09D 7/63; C09D 163/00; C09D 175/04; C09D 175/14
USPC ...................................................... 428/425.1
See application file for complete search history.

(56) References Cited

U.S. PATENT DOCUMENTS

| | | | | |
|---|---|---|---|---|
| 2016/0333220 A1 * | 11/2016 | Walters | ............... | C08G 18/792 |
| 2017/0136493 A1 * | 5/2017 | Lamers | ............... | C08G 18/246 |

FOREIGN PATENT DOCUMENTS

| | | | | |
|---|---|---|---|---|
| CN | 104293044 A | 1/2015 | | |
| CN | 107286825 A | 10/2017 | | |
| CN | 109504204 A | 3/2019 | | |
| CN | 109593182 A * | 4/2019 | ......... | C08G 18/7843 |
| CN | 107141990 B | 11/2019 | | |
| CN | 111925698 A | 11/2020 | | |
| DE | 19860170 | 6/2000 | | |
| FR | 2943575 A1 * | 10/2010 | .............. | B05D 7/08 |
| JP | 2019031667 A * | 2/2019 | .......... | C08G 18/283 |
| KR | 2019106565 A * | 9/2019 | .......... | C09D 175/04 |
| WO | 03068418 A2 | 8/2003 | | |
| WO | WO-2018056408 A1 * | 3/2018 | .......... | C08G 18/283 |
| WO | WO-2018070533 A1 * | 4/2018 | ............. | C08G 18/77 |
| WO | WO-2018070536 A1 * | 4/2018 | .......... | C08G 18/022 |
| WO | 2019113402 A1 | 6/2019 | | |

OTHER PUBLICATIONS

Werner, "Learning Center Isocyanate Chemistry", Nov. 20, 2006 (Year: 2006).*
Machine translation of FR 2 943 575 A1 (Year: 2010).*
Machine translation of CN 109593182 A (Year: 2019).*
Machine translation of KR 2019/0106565 A (Year: 2019).*
Machine translation of WO 2018/056408 A1 (Year: 2018).*
Machine translation of WO 2018/070533 A1 (Year: 2018).*
Machine translation of WO 2018/070536 A1 (Year: 2018).*
Machine translation of JP 2019-031667 A (Year: 2019).*
International Search Report and Written Opinion for PCT Application No. PCT/CN2022/091406 dated Sep. 15, 2022, 12 pages.

* cited by examiner

*Primary Examiner* — Callie E Shosho
*Assistant Examiner* — Steven A Rice
(74) *Attorney, Agent, or Firm* — Tucker Ellis LLP

(57) ABSTRACT

The present application relates to a two-component aqueous sealing primer for wood, comprising: Component A: a film-forming resin composition comprising at least one aqueous emulsion of cationic resin and optionally at least one additional additive; and Component B: a curing agent composition comprising at least one polyisocyanate. The formed sealing coating can substantially seal the tannin, grease, and other substances in the wood, and has good sandability.

19 Claims, No Drawings

TWO-COMPONENT AQUEOUS SEALING PRIMER FOR WOOD SUBSTRATE, SEALING COATING FORMED THEREOF AND ARTICLE

TECHNICAL FIELD

The present application relates to a two-component aqueous sealing primer for wood substrate, a sealing coating formed therefrom, and an article comprising the sealing primer.

BACKGROUND

Wood products include wood furniture, which are the most commonly used products in production and life, and are mainly made of wood substrates. As we all know, wood substrates have charm unmatched by other materials, such as special texture, natural color and so on. However, wood substrates inevitably have the characteristics of complex structure, uneven texture, being porous, water swelling and shrinkage, and undesired substances such as grease, tannin and other colored impurities.

Because the cationic resin can interact with tannins, turpentine and other substances in the wood, a resulting salt substance that is fixed on the interface by the coating and will not migrate and exude under high temperature and high humidity conditions can prevent the coating from discoloring and result in a good sealing effect. Therefore, cationic resins are important film-forming material for wood sealing primers.

In the market of sealing primer for wood, primers containing cationic resins account for approximately 90% of the market. Although one-component primers containing cationic resins are effective in blocking tannins, they also have obvious disadvantages, such as low hardness and poor sandability.

Therefore, the field of wood paint, there is still a need for a sealing primer that has good sealing effect and ensures the sandability of the paint film at the same time.

SUMMARY

The present application provides two-component aqueous sealing primer for wood, comprising: Component A that is a film-forming resin composition comprising at least one aqueous emulsion of cationic resin and optionally at least one additional additive; and Component B that is a curing agent composition comprising at least one polyisocyanate.

The Component A and the Component B are mixed in a certain weight ratio before use. In some embodiments of the present application, the weight ratio of Component A to Component B is in the range of 100:5 to 100:15.

In some embodiments of the present application, the at least one aqueous emulsion of cationic resin comprises at least one acrylic resin, at least one polyurethane acrylate (PUA), at least one polyurethane resin, at least one epoxy resin, or combination thereof.

In an embodiment of the present application, the curing agent composition comprises at least one non-ionic water-borne polyisocyanate. In other embodiments of the present application, the curing agent composition comprises at least one solvent-based polyisocyanate and at least one co-solvent. In yet other embodiments of the present application, the curing agent composition comprises at least one non-ionic waterborne polyisocyanate, at least one solvent-based polyisocyanate, and at least one co-solvent.

In another aspect, the present application relates to sealing coating formed by the two-component aqueous sealing primer for wood according to the present application.

In an embodiment, according to GB/T6739-2006, the sealing coating of the present application has a pencil hardness of at least F.

In addition, the present application further provides an article comprising: a wood substrate having at least one major surface; and the sealing coating according to the present application which is formed on at least one part of the major surface.

It has been surprisingly found that, on the basis of the conventional one-component coating composition containing cationic resin, the original one-component coating composition was upgraded to a two-component coating composition by matching a suitable polyisocyanate curing agent. The resulting two-component coating composition not only maintains the function of cationic resin to block acidic substances such as tannins, but also improves the grease-blocking performance of the paint film, and more importantly, improves the hardness and sandability of the paint film.

Based on the water-based cationic resin emulsion, the present application innovatively selects at least one polyisocyanate as the curing agent, and upgrades the original one-component cationic sealing primer coating composition to a two-component coating composition, which not only maintains the function of cationic resin to block tannin, and improve the grease-blocking performance of the paint film, improves the hardness and sandability of the paint film, and provides a new idea for the selection of curing agent in the two-component sealing primer containing cationic resin for wood. It has never been recognized before the present application.

The details of one or more embodiments of the disclosure are set forth in the following description. Other features, objects, and advantages of the disclosure will be apparent from the description and from the claims.

SELECTED DEFINITIONS

As used herein, "a", "an", "the", "at least one", and "one or more" are used interchangeably, unless indicated otherwise. Thus, for example, a coating composition that comprises "an" additive can be interpreted to mean that the coating composition includes "one or more" additives.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as long as such components or steps do not affect the basic and novel characteristics of what is described herein, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

When used in the context of a substrate, the term "major surface" is a surface defined by the lengthwise and widthwise dimensions of the substrate for providing the decoration.

As used herein, the term "primer" refers to a coating composition that can be applied to a substrate and dried, crosslinked, or otherwise hardened to form a non-tacky continuous film having sufficient adhesion to the surface of the substrate.

The term "on" when used in the context of "a coating applied on something" includes a coating being applied directly or indirectly on another coating.

As used herein, the term "cationic resin" refers to a linear or cross-linked resin containing cationic groups on the side chains or end groups of the polymer of the resin or the emulsifier used to stabilize the polymer. Examples of the cationic group include amino-based functional groups, quaternary ammonium salt groups.

As used in the present application, the term "volatile organic compound (VOC)" refers to any carbon-containing compound other than carbon monoxide, carbon dioxide, carbonic acid, metal carbides or carbonates that participates in atmospheric photochemical reactions. Typically, volatile organic compounds have vapor pressures of 0.1 mm Hg or higher. As used herein, "volatile organic compound content (VOC content)" refers to the weight of VOC per volume of coating solids, e.g., reported as g/liter (g/L). Herein, the VOC of the two-component aqueous sealing primer for wood refers to the VOC of the mixture of the Component A and the Component B. Herein all VOC values are determined according to the standard HJ2537-2014.

When appearing in this specification and claims, the terms "comprising" and "including" and variations thereof do not have a restrictive meaning.

The terms "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of what is described herein.

DETAILED DESCRIPTION

In an aspect, the present application provides a two-component aqueous sealing primer for wood, comprising:

Component A: a film-forming resin composition comprising at least one aqueous emulsion of cationic resin and optionally at least one additional additive; and Component B: a curing agent composition comprising at least one polyisocyanate.

Film-Forming Resin Composition

In some embodiments of the present application, the at least one aqueous emulsion of cationic resin comprises at least one acrylic resin, at least one polyurethane acrylate (PUA), at least one polyurethane resin, at least one epoxy resin, or combination thereof.

In the present application, the aqueous cationic resin emulsion can be prepared using suitable polymerization methods well known to those skilled in the art, or any suitable commercially available product can be used, such as an aqueous emulsion of cationic resin (like Acrylic copolymer emulsion 1 in the Examples) and the like. Preferably, the aqueous cationic resin emulsion has a solids content of 40-65 wt %.

In one embodiment, the two-component aqueous sealing primer for wood comprises, relative to the total weight of the two-component aqueous sealing primer for wood, at least 50% by weight of a film-forming resin composition. In one embodiment, the two-component aqueous sealing primer for wood comprises, relative to the total weight of the two-component aqueous sealing primer for wood, at least 60% by weight of the film-forming resin composition. In other embodiments, the content of the film-forming resin composition is at least 70% by weight, at least 80% by weight, at least 88% by weight, at least 90% by weight or more, relative to the total weight of the two-component aqueous sealing primer for wood. According to the present application, the content of the film-forming resin composition is at most 95% by weight, at most 94% by weight, at most 92% by weight or less, relative to the total weight of the two-component aqueous sealing primer for wood.

In many embodiments, the aqueous cationic resin emulsion is present in an amount of about 50 wt %, about 55 wt %, about 60 wt %, about 65 wt % to about 70 wt %, about 80 wt %, about 90% by weight, relative to the total weight of the film-forming resin composition.

The film-forming resin composition according to certain embodiments of the present application further comprises a coalescent to assist the film-forming of the aqueous cationic resin emulsion. Suitable coalescents include alcohols such as ethylene glycol, propylene glycol, hexylene glycol, benzyl alcohol and the like.; alcohol esters such as dodecyl alcohol ester; alcohol ethers such as ethylene glycol monobutyl ether (BCS), propylene glycol methyl ether, propylene glycol ethyl ether, propylene glycol n-propyl ether, propylene glycol butyl ether, dipropylene glycol methyl ether, dipropylene glycol propyl ether, dipropylene glycol n-butyl ether (DPNB), tripropylene glycol n-butyl ether, etc.; alcohol ether esters, such as hexylene glycol butyl ether acetate; diesters such as diisobutyl dicarboxylate. As examples of diester coalescents, diester mixtures and dicarboxylic acid-diisobutyl ester can be used.

In one embodiment, the film-forming resin composition comprises, relative to the total weight of the film-forming resin composition, from about 2 to about 10 wt %, preferably from about 2 to about 8 wt % of a coalescent. Specifically, the amount of the coalescent contained in the film-forming resin composition is, relative to the total weight of the film-forming resin composition, from about 2 wt %, about 3 wt %, about 4 wt %, about 5 wt % to about 10 wt %, about 9 wt %, or about 8 wt %.

If necessary, the film-forming resin composition according to the present application may optionally contain one or more fillers. The term "filler" as used herein refers to any volume extender suitable for coatings, which may be organic or inorganic, for example, in the form of particles. There is no particular limitation on the shape of the particles, and they can have any appropriate shape. The average particle size of the filler can vary within a wide range, for example within a range of about 10 nanometers to about 50 microns. Some fillers, in addition to functioning as volume extenders, also impart one or more desired properties to the composition and/or the coating formed from the composition. For example, some fillers can impart the desired color to the composition and the coating resulting from the composition. In this case, this filler is also called "pigment". Some fillers can improve the chemical and/or physical properties, especially the mechanical properties of the coating obtained from the composition. In this case, such filler is also called "reinforcing filler".

In the embodiments of the present application, suitable fillers may include, for example, zinc stearate, china clay, wollastonite, barite, calcium carbonate, diatomaceous earth, talc, barium sulfate, magnesium aluminum silicate, silicon dioxide, and any combination thereof.

In the present application, the film-forming resin composition may optionally further comprise conventional additives which do not adversely affect the two-component aqueous coating composition or the cured coating obtained therefrom. Suitable additives include, for example, the agents that can improve the processability or manufacturing properties of the composition, enhance the aesthetics of the composition, or improve the specific functional properties or properties of the coating composition or the cured composition obtained therefrom (such as adhesion to the substrate), or reduce the cost. Examples of such additives are for example fillers, lubricants, coalescing agents, wetting agents, plasticizers, defoamers, colorants, antioxidants, flow control agents, thixotropic agents, dispersants, adhesion promoters, UV stabilizers, thickeners, pH adjusters, solvents, or combination thereof. The content of each optional ingredient is sufficient to achieve its intended purpose, but preferably such content does not adversely affect the two-component aqueous coating composition or the cured coating obtained therefrom. In one embodiment of the present application, the film-forming resin composition of the present application may contain a thicker, a dispersant, a leveling agent, a defoamer, a wetting agent, a pH adjuster, a fungicide, a preservative, or any combination thereof as conventional additives.

Suitable thickeners comprise cellulose ether thickeners, alkali swelling thickeners, polyurethane thickeners, hydrophobically modified polyurethane thickeners, or any combination thereof, preferably hydrophobically modified polyurethane thickeners. All types of thickeners are commercially available products. For example a cellulose ether thickener like a methylhydroxyethyl cellulose ether thickener can be used. Also, an alkali swelling thickener can be used. Further, a hydrophobically modified polyurethane thickener can also be used.

In one embodiment, the film-forming resin composition comprises from about 0.1% by weight to about 2% by weight, preferably about 0.4% by weight to about 1.0% by weight of the thicker, relative to the total weight of the film-forming resin composition. Specifically, the amount of thickener contained in the film-forming resin composition is, relative to the total weight of the film-forming resin composition, from about 0.2% by weight, about 0.3% by weight, about 0.4% by weight, about 0.5% by weight, about 0.6% by weight, about 0.7% by weight, about 0.8% by weight, or about 0.9% by weight to about 2.0% by weight, about 1.5% by weight, about 1.0% by weight.

Suitable dispersants may comprise anionic dispersants, cationic dispersants, nonionic dispersants, amphoteric dispersants, or any combination thereof, preferably nonionic dispersants. All types of dispersants are commercially available products.

In one embodiment, the film-forming resin composition, relative to the total weight of the film-forming resin composition, may comprise from about 0.1% by weight to about 1.5% by weight, preferably from about 0.2% by weight to about 0.9% by weight of the dispersant. Specifically, the amount of the dispersant contained in the film-forming resin composition is, relative to the total weight of the film-forming resin composition, from about 0.2% by weight, about 0.3% by weight, about 0.4% by weight, or about 0.5% by weight. % by weight, about 0.6% by weight to about 1.5% by weight, about 1.0% by weight, or about 0.9% by weight.

The leveling agent is an agent that can promote the film-forming resin composition to form a flat, smooth and uniform coating film during the film-forming process. Suitable leveling agents include silicone leveling agents, polyacrylic leveling agents, or any combination thereof. As an example of a commercially available leveling agent, a modified urea solution can be used.

Suitable defoamers include organosiloxane defoamers, grease defoamers, polyether defoamers, polyether modified silicone defoamers, or any combination thereof. All types of defoamers are commercially available products.

In one embodiment, the film-forming resin composition comprises from about 0.1% by weight to about 1% by weight, preferably about 0.2% by weight to about 0.8% by weight of the defoamer, relative to the total weight of the film-forming resin composition. Specifically, the amount of the defoamer contained in the film-forming resin composition is, relative to the total weight of the film-forming resin composition, from about 0.1% by weight, about 0.2% by weight, 0.3% by weight, about 0.4% by weight, about 0.5% by weight, or about 0.6% by weight to about 1.0% by weight, about 0.9% by weight, or about 0.8% by weight.

Suitable wetting agents include silicone-based wetting agents, acetylene glycol-based wetting agents, or combinations thereof. All types of wetting agents are commercially available products.

In one embodiment, the film-forming resin composition comprises from about 0.1% by weight to about 2% by weight, preferably about 0.4% by weight to about 1.0% by weight of the wetting agent, relative to the total weight of the film-forming resin composition. Specifically, the amount of the wetting agent contained in the film-forming resin composition is, relative to the total weight of the film-forming resin composition, from about 0.2% by weight, about 0.3% by weight, about 0.4% by weight, about 0.5% by weight, about 0.6% by weight, about 0.7% by weight, about 0.8% by weight, or about 0.9% by weight to about 2.0% by weight, about 1.5% by weight, about 1.0% by weight.

Suitable pH adjusters include inorganic or water-soluble organic acids with pH <7, such as acetic acid.

In one embodiment, the film-forming resin composition comprises from about 0.1 to about 1.0% by weight, preferably about 0.1 to about 0.3% by weight of the pH adjuster, relative to the total weight of the film-forming resin composition. Specifically, the amount of the pH adjuster contained in the film-forming resin composition is from about 0.1% by weight or about 0.2% by weight to about 1.0% by weight, 0.7% by weight, about 0.5% by weight, or about 0.3% by weight, relative to the total weight of the film-forming resin composition.

Suitable preservatives include isothiazolinones, benzimidazoles, substituted aromatic hydrocarbons, organic bromines, organic amines, pipertriazines, or any combination thereof. All types of preservatives may be commercially available products.

In one embodiment, the film-forming resin composition comprises from about 0.1 to about 1% by weight, preferably about 0.1 to about 0.5% by weight of a preservative, relative to the total weight of the film-forming resin composition. Specifically, the amount of the preservative contained in the film-forming resin composition is, relative to the total weight of the film-forming resin composition, from about 0.1% by weight, 0.2% by weight, about 0.3% by weight or about 0.4% by weight % to about 1.0% by weight, about 0.9% by weight, about 0.7% by weight, or about 0.5% by weight.

Suitable fungicides include isothiazolinones, benzimidazoles, iodopropargyls, substituted aromatic hydrocarbons, dithiocarbamates, carbendazim diuron, or any combination thereof. All types of fungicides are commercially available products.

In one embodiment, the film-forming resin composition comprises from about 0.1 to about 1% by weight, preferably about 0.1 to about 0.5% by weight of the fungicide, relative to the total weight of the film-forming resin composition. Specifically, the amount of the fungicide contained in the film-forming resin composition is, relative to the total weight of the film-forming resin composition, from about 0.1% by weight, 0.2% by weight, about 0.3% by weight, or about 0.4% by weight to about 1.0% by weight, about 0.9% by weight, about 0.7% by weight, or about 0.5% by weight.

Any appropriate aqueous medium can be used to adjust the viscosity of the film-forming resin composition. Suitable aqueous media include water-soluble organic solvents, water and mixtures thereof. The aqueous medium is selected to adjust the viscosity of the film-forming resin composition for further formulation.

Suitable water-soluble organic solvents include alcohols (such as ethanol, n-propanol, isopropanol, n-butanol, isobutanol, etc.); ketones (such as acetone, 2-butanone, cyclohexanone, methyl aryl ketone, ethyl aryl ketone, methyl isoamyl ketone, etc.); glycols (such as butyl glycol); glycol ethers (such as ethylene glycol monomethyl ether, ethylene glycol mono ethyl ether, ethylene glycol monobutyl ether, propylene glycol monomethyl ether, methoxypropanol, dipropylene glycol methyl ether, etc.), glycol esters (such as butyl glycol acetate, methoxypropyl acetate, etc.); and mixtures thereof. In many embodiments, glycol ethers are used as organic solvents.

The amount of the aqueous medium contained in the film-forming resin composition may vary, for example, according to the coating method and the required viscosity. One embodiment of the film-forming resin composition contains 2-20% by weight of an aqueous medium, more preferably 2-10% by weight of water.

The content of each optional component is sufficient to achieve its intended purpose, but preferably, such content does not adversely affect the film-forming resin composition or the cured coating obtained therefrom. According to certain embodiments of the present application, the total amount of additional additives is in the range of about 0% to about 20% by weight, preferably about 1% to about 10% by weight, relative to the total weight of the film-forming resin composition.

In an embodiment according to the present application, based on the total weight of the film-forming resin composition, the film-forming resin composition according to the present application comprises:

50-90 wt % of the at least one aqueous emulsion of cationic resin;

2-10 wt % of at least one coalescent;

2-20 wt % of at least one aqueous solvent;

0-10 wt % of at least one filler; and 0-10 wt % of the at least one additional additive, wherein the at least one additional additive comprises thickener, wetting agent, leveling agent, defoaming agent, dispersing agent, pH adjuster, antiseptics, preservatives, or any combinations thereof.

Curing Agent Composition

In an embodiment according to the present application, the Component B, i.e. the curing agent composition, comprises at least one polyisocyanate.

The term "isocyanate" as used herein refers to a compound containing at least one isocyanate group (—NCO), which may be a small molecule compound or an oligomer. The term "polyisocyanate" refers to a compound containing at least two isocyanate groups (—NCO). The isocyanate functional group can undergo chain extension and crosslinking reactions with the active hydrogen polymer, thereby forming a three-dimensional network structure in the coating. Suitable isocyanates include aliphatic polyisocyanates, aromatic polyisocyanates, or any combination thereof. The term "aliphatic polyisocyanate" as used herein refers to a polyisocyanate compound in which an isocyanate group is directly connected to an aliphatic chain or ring. The term "aromatic polyisocyanate" as used herein refers to a polyisocyanate compound in which an isocyanate group is directly connected to an aromatic ring.

As examples of suitable polyisocyanate compounds, hexamethylene diisocyanate, dodecamethylene diisocyanate, cyclohexane-1,4-diisocyanate, 4,4'-dicyclohexylmethane diisocyanate, cyclopentane-1,3-diisocyanate, p-phenylene diisocyanate, toluene-2,4-diisocyanate, naphthalene-1,4-diisocyanate, biphenyl-4,4'-diisocyanate, benzene-1,2,4-triisocyanate, xylene-1,4-diisocyanate, xylene-1,3-diisocyanate, diphenylmethane diisocyanate, butane-1,2,3-triisocyanate or polymethylene polyphenyl polyisocyanate can be used.

As examples of suitable isocyanate oligomers, polyurethane prepolymers of any of the polyisocyanate compounds listed above, polyester prepolymers of any of the polyisocyanate compounds listed above, or polyether prepolymers of any of the polyisocyanate compounds listed above can be used. The polyurethane prepolymer (for example, hexamethylene diisocyanate (HDI) trimer), polyester prepolymer or polyether prepolymer can be made by any suitable method known to those skilled in the art. For example, a polyurethane prepolymer can be made by reacting a polyol monomer with one or more of the polyisocyanate compounds under appropriate conditions; a polyester prepolymer or a polyether prepolymer can be made by reacting a polyester polyol or polyether polyol with one or more of the polyisocyanate compounds under appropriate conditions. Alternatively, as the polyurethane prepolymer, polyester prepolymer, or polyether prepolymer, any appropriate commercial product can be used. In one embodiment of the present application, the isocyanate includes hexamethylene diisocyanate (HDI) trimer.

The present application relates to a two-component aqueous sealing primer for wood. In order to be used in a aqueous system, a polyisocyanate with strong lipophilicity needs to be hydrophilically modified to prepare the hydrophilic polyisocyanate. The methods of hydrophilic modification of polyisocyanates include: (1) non-ionic hydrophilic modification using hydroxyalkyl ethers of hydrophilic polyether polyols; (2) ionic modification by introducing anionic or cationic groups into its molecules; (3) mixed modification with the above two methods. However, the method of cationic modification is very rare in practice, and there are almost no available products, so the cationic modification has basically no application value. Therefore, common hydrophilic polyisocyanates include anionic waterborne polyisocyanates and non-ionic waterborne polyisocyanates. In the two-component aqueous sealing primer for wood according to the present application, the film-forming resin composition contains an aqueous emulsion of cationic resin, and if an anion-modified polyisocyanate is used as a curing agent, the system will flocculate and the desired sealing coating cannot be obtained.

In certain embodiments according to the present application, the curing agent composition comprises at least one non-ionic waterborne polyisocyanate.

Generally, aromatic polyisocyanates are easy to react with water, generate carbon dioxide, and easily cause yellowing of paint film. Thus, in certain embodiments of the present application, the non-ionic waterborne polyisocyanate comprises at least one aliphatic polyisocyanate.

Non-ionic waterborne polyisocyanates obtain hydrophilicity by introducing hydrophilic non-ionic groups into their structures. In certain embodiments according to the present application, the non-ionic waterborne polyisocyanate comprises non-ionic groups derived from polyethers.

In many embodiments, the polyether comprises polyethylene glycol monoether, monoether of copolymer of polyethylene and polypropylene glycol, or any combination thereof; preferably the polyether comprises polyethylene glycol monomethyl ether, polyethylene glycol monoethyl ether, polyethylene glycol monobutyl ether, poly(ethylene glycol-propylene glycol) monobutyl ether, or any combination thereof; more preferably the polyether comprises polyethylene glycol monomethyl ether containing on average 5-10 ethyleneoxy ($-CH_2CH_2-O-$) units.

Polyisocyanates that are not modified with hydrophilic groups are generally referred to as solvent-based polyisocyanates. Usually solvent-based polyisocyanates are not adequately dispersed in aqueous systems, and have poor compatibility with water-based resin systems. However, in some cases, such as selecting a suitable co-solvent (propylene glycol methyl ether acetate (PMA), propylene glycol diacetate (PGDA), methyl isobutyl ketone (MIBK), or any combination thereof), the solvent-based polyisocyanates can be used in aqueous systems.

In certain embodiments of the present application, the curing agent composition comprises at least one solvent-based polyisocyanate and at least one co-solvent. Generally, aromatic polyisocyanates are easy to react with water, generate carbon dioxide, and easily cause yellowing of paint film. Thus, in certain embodiments of the present application, the at least one solvent-based polyisocyanate comprises an aliphatic polyisocyanate.

In other embodiments of the present application, the curing agent composition comprises at least one of the above-mentioned non-ionic waterborne polyisocyanates, at least one of the above-mentioned solvent-based polyisocyanates, and at least one of the above-mentioned co-solvents. The non-ionic waterborne polyisocyanate has good compatibility with the aqueous emulsion, and the solvent-based polyisocyanate has a higher average functionality, which can increase the crosslinking density in the reaction with the film-forming resin, thereby increasing the hardness of the resulting sealing coat, and the sandability of the paint film is further improved. In certain embodiments, the two curing agents in the curing agent composition have a specific ratio to balance the compatibility with the system and the crosslinking density, so as to achieve the maximum hardness and board surface effect. In certain embodiments, the weight ratio of the at least one above-mentioned non-ionic waterborne polyisocyanate and the at least one above-mentioned solvent-based polyisocyanate is in the range of 9:1 to 1:9, preferably, in the range of 9:1:1 to 2:8 range, in the range of 9:1 to 3:7, in the range of 9:1 to 4:6, or in the range of 9:1 to 5:5. In certain embodiments, based on the total weight of the curing agent composition, the curing agent composition comprises:

30 to 99.99% by weight of non-ionic waterborne polyisocyanates;
 0.01 to 50% by weight of solvent-based polyisocyanates;
 0 to 20% by weight of co-solvent.

Two-Component Aqueous Sealing Primer for Wood

The two-component aqueous sealing primer for wood according to the embodiment of the present application includes Component A (film-forming resin composition) and Component B (curing agent composition). During application, Component A and Component B need to be mixed uniformly in a certain weight ratio, and then applied on the surface of a wood substrate. The weight ratio of the Component A to the Component B is usually in the range of 100:5 to 100:15, preferably in the range of 100:8 to 100:12.

In many embodiments of the present application, the two-component aqueous sealing primer for wood has a VOC content of 600 g/L or less. In some embodiments, the two-component aqueous sealing primer for wood has a VOC content of 500 g/L or less. In another embodiment, the two-component aqueous sealing primer for wood has a VOC content of 300 g/L or less. In some embodiments, the two-component aqueous sealing primer for wood has a VOC content of 150 g/L or less.

It has been surprisingly found that the original one-component cationic sealing primer coating composition was upgraded to a two-component coating by making improvements on the basis of the conventional one-component coating composition containing cationic resin and matching a suitable polyisocyanate curing agent. The composition not only maintains the function of the cationic resin primer to block acidic substances such as tannins, but also improves the performance of the paint film to block grease, and also improves the hardness and sandability of the paint film, and provides a new idea for the improvements of aqueous sealing primer containing cationic resin for wood. It has never been recognized before the present application.

Without wishing to be bound by any theory, the following explanations are provided to enable the present application to be better understood.

In the two-component aqueous sealing primer for wood according to the present application, the cationic resin can interact with anionic substances such as tannic acid contained in the wood substrate, thereby forming a barrier layer, and can interact with the hydroxyl groups of the wood substrate, to form hydrogen bonds to prevent moisture from entering the wood substrate, thereby reducing or eliminating the phenomenon of "grain puffing"; in addition, the selection of specific curing components to crosslink with the film-forming resin in the film-forming resin composition allows the sealing coating have increased crosslinking density, thus further enhancing the sealing properties.

According to certain embodiments of the present application, a two-component aqueous sealing primer for wood can be prepared by mixing an aqueous emulsion of cationic resin with optional additional additives to obtain a film-forming resin composition, and then simply mixing with the curing agent composition in a predetermined weight ratio in a mixing device prior to application.

According to the present application, the two-component aqueous sealing primer for wood can be applied by conventional coating methods known to those skilled in the art. The coating methods include dip coating, spin coating, spray coating, curtain coating, brush coating, roller coating, and other coating methods known in the art. In one embodiment of the present application, the coating is carried out using a spray coating process. In this way, a sealing coating can be formed from the two-component sealing primer for wood according to the present application, which also falls within the scope of the present application.

Accordingly, in another aspect of an embodiment of the present application, there is provided a sealing coating obtainable from the two-component aqueous sealing primer for wood described herein. The sealing coating has a pencil hardness of at least F according to GB/T6739-2006.

In many embodiments, the two-component aqueous sealing primer for wood can be applied in various thicknesses. In certain embodiments, the coating weight is in the range of 70-100 g/m². In certain embodiments, the dry film thickness of the sealing coating formed is in the range of 15-50 microns, preferably in the range of 18-30 microns. The applied coating may be dried by air drying or by accelerating drying with various drying devices e.g., ovens that are familiar to those skilled in the art.

Another aspect of an embodiment of the present application provides an article comprising: a wood substrate having at least one major surface; and a sealing coating, wherein the sealing coating is formed from the two-component aqueous sealing primer for wood according to the present application which is applied on at least a portion of the major surface.

As the wood substrate used to manufacture the wood article of the present application, any suitable wood substrate known in the art can be used. In the present application, the term "wood substrate" refers to any cellulose/lignin material derived from the hard, fibrous structural organization of the stems and roots of trees or other woody plants. Wood includes, for example, hardwood and softwood wood cut directly from trees, and engineered wood composite materials made of wood strips, wood chips, wood fibers, or wood veneers. Examples of wood composite materials include, but are not limited to, plywood, oriented strand board (OSB), medium density fiberboard (MDF), particle board, and the like.

The wood article of the present application comprises a wood substrate containing an acidic substance. As an example, the acidic substance includes tannins, aldehydes and/or hemiacetals. In some embodiments of the present application, the wood substrate has a tannin content of at least 0.1% by weight, preferably a tannin content of at least 1% by weight, more preferably a tannin content of at least 5% by weight, and even more preferably a tannin content of at least 10% by weight, even more preferably a tannin content of 30% by weight, as determined by CNS4716-2005. As exemplary wood substrates, hardwood, chestnut, eucalyptus, red chestnut, camellia, eucalyptus, Douglas fir, Japanese cedar, American cypress, Japanese red pine, Japanese cypress, water walnut, black walnut, maple, Japan beech, Japanese paulownia, birch, Borneo, magnolia, ash, teak, Xylosma japonicum, Catalpa wood, *Dryobalanops* spp., fir, oak and rubber wood.

According to the present application, the wood substrate has at least one, preferably two major surfaces facing each other. As used herein, the "major surface" is the surface for decoration formed by the length and width dimensions of the wood substrate.

According to the present application, the wood article can be prepared, for example, by the following steps: (1) providing a polished wood substrate; (2) applying the two-component aqueous sealing primer for wood according to an embodiment of the present application on the wood substrate one or more times by using a coating and curing process, to form one or more sealing coatings according to the embodiments of the present application to provide the wood substrate with the desired sealing properties. Further, the process for preparing the article may further include further steps, such as (3) applying a primer on the sealer to obtain a primer; and (4) applying a topcoat on the primer to obtain a top coat.

According to the present application, the wood articles thus obtained can be used in the following applications, including, but not limited to: household furniture, such as tables, chairs, cabinets, etc.; bedroom and bathroom furniture; office furniture; custom furniture, such as school and children's furniture, hospitals furniture, restaurant and hotel furniture, kitchen cabinets and furniture; panels for interior design; indoor and outdoor windows and doors; indoor and outdoor window and door frames; outdoor and indoor wall panels and wooden floors.

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available and used directly without further treatment.

EXAMPLES

Testing Methods

VOC content was measured according to the standard HJ2537-2014.

Sandability was measured according to the standard GB/T23999-2009.

Sealing property: a "room temperature method" or a "hot steaming method" was used. "Room temperature method" includes spraying the sealing primer on the wood substrate, and then spraying a white topcoat of the same thickness, and leaving it at room temperature for 1 day, 3 days and 7 days, using a colorimeter to detect Δb and ΔE. "Hot steaming method" includes spraying the sealing primer on the wood substrate, and then spraying a white topcoat of the same thickness, after drying, covering the topcoat with a wet rag, and sealing it with PE film. The sample was placed in a 50° C. oven for one day, and Δb and ΔE were detected with a colorimeter.

Pencil Hardness was measured to test the hardness of a cured coating. The pencil hardness was evaluated according to GB/T6739-2006. Data was reported as the pencil hardness of the last successful test before the coating cracked. Thus, for example, if the coating did not crack when tested with a 2H pencil, but did crack when tested with a 3H pencil, the coating was reported as having a pencil hardness of 2H.

Adhesion was determined by the cross-cut method according to ASTM D3359. Adhesion is usually classified as 0-5B, where 5B represents the optimal adhesion.

Materials

The materials used are listed in Table 1 below.

TABLE 1

| Materials and related information | |
| --- | --- |
| Raw Material | Description |
| Acrylic copolymer emulsion 1 | aqueous emulsion of cationic resin |
| Acrylic copolymer emulsion 2 | aqueous emulsion of cationic resin |
| Acrylic emulsion 3 | aqueous emulsion of cationic resin |

TABLE 1-continued

Materials and related information

| Raw Material | Description |
|---|---|
| Anionic emulsion 1 | aqueous emulsion of anionic resin |
| Isocyanate 1 | non-ionic waterborne polyisocyanate |
| Isocyanate 2 | solvent-based polyisocyanate |
| Co-solvent | PMA (Propylene Glycol Mono-methyl Ether Acetate) |

According to the amounts shown in Table 2, the commercially available 100% aqueous emulsion of cationic resin and additional additives were mixed as Component A; the non-ionic waterborne polyisocyanate alone, solvent-based polyisocyanate and co-solvent, or non-ionic waterborne polyisocyanate, solvent-based polyisocyanate and co-solvent were mixed as Component B. Then, the obtained Component A and Component B were mixed in a certain weight ratio, thereby forming the two-component aqueous sealing primer for wood of Examples 1-6. Comparative Examples 1-2 (also as CE.1-2) were a one-component aqueous wood sealing primer for wood containing cationic resin and a one-component aqueous sealing primer for wood containing anionic resin, respectively.

grease-blocking performance of the paint film, and more importantly, improves the hardness and sandability of the paint film.

In Example 1, a non-ionic waterborne polyisocyanate was used as the curing agent, and the hardness and sealing property of the formed paint film were better, but the sandability was slightly lower than that of the other examples.

In Example 2, a solvent-based polyisocyanate was used as the curing agent, and the hardness of the formed paint film was high, but the appearance of the paint film was slightly worse than that of other examples, the surface of the paint film was rough, and the degree of decrease in transparency was high.

In Examples 3 to 6, non-ionic waterborne polyisocyanate s and solvent-based polyisocyanates were used as curing agent, and the hardness of the obtained paint films was obviously improved and the sanding properties were improved when the type of cationic resin emulsion was changed and the weight ratio of the two isocyanates was changed, and both tannin blocking and grease blocking can meet the requirements.

The paint film formed by the one-component aqueous cationic resin sealing primer in Comparative Example 1 had

TABLE 2

| | Material | Example 1 | Example 2 | Example 3 | Example 4 | Example 5 | Example 6 | CE. 1 | CE. 2 |
|---|---|---|---|---|---|---|---|---|---|
| Component A | aqueous emulsion of cationic resin — Acrylic Copolymer Emulsion 1 | 75 | 75 | 75 | 75 | | | | 75 |
| | Acrylic Copolymer Emulsion 2 | | | | | 75 | | | |
| | Acrylic Copolymer Emulsion 3 | | | | | | 75 | | |
| | Anionic Emulsion 1 | | | | | | | | 75 |
| | Deformer | 0.5 | 0.5 | 0.5 | 0.5 | 0.5 | 0.5 | 0.5 | 0.5 |
| | Thickener | 0.8 | 0.8 | 0.8 | 0.8 | 0.8 | 0.8 | 0.8 | 0.8 |
| | Wetting agent | 0.5 | 0.5 | 0.5 | 0.5 | 0.5 | 0.5 | 0.5 | 0.5 |
| | Filling slurry | 6 | 6 | 6 | 6 | 6 | 6 | 6 | 6 |
| | Coalescent | 7 | 7 | 7 | 7 | 7 | 7 | 7 | 7 |
| | Water | 10.2 | 10.2 | 10.2 | 10.2 | 10.2 | 10.2 | 10.2 | 10.2 |
| Component B | Non-ionic waterborne polyisocyanate | 100 | / | 42 | 30 | 42 | 42 | / | / |
| | Solvent-based polyisocyanate | / | 80 | 42 | 50 | 42 | 42 | / | / |
| | Co-solvent | / | 20 | 16 | 20 | 16 | 16 | / | / |
| Component A:Component B (weight ratio) | | 10:1 | 10:1 | 10:1 | 10:1 | 10:1 | 10:1 | / | / |
| Property | VOC g/L | 68.8 | 88.2 | 84.2 | 88.2 | 84.3 | 84.3 | 75.6 | 75.6 |
| | pencil hardness | F | F | F | F | F | F | B | HB |
| | sandability | 4 | 5 | 5 | 5 | 5 | 5 | 3 | 5 |
| | tannin blocking | 5 | 5 | 5 | 5 | 5 | 5 | 5 | 3 |
| | Grease blocking | 5 | 5 | 5 | 5 | 5 | 5 | 4 | 3 |

Then, the properties of the aqueous sealing primers for wood of Examples 1-6 and Comparative Examples 1-2 were tested, including pencil hardness, sandability, tannin blocking and grease blocking, and the results were shown in Table 2.

It can be seen from the results in Table 2 that, on the basis of the conventional one-component coating composition containing cationic resin, the original one-component coating composition was upgraded to a two-component coating composition by matching a suitable polyisocyanate curing agent. The resulting two-component coating composition not only maintained the function of cationic resin to block acidic substances such as tannins, but also improved the lower pencil hardness and lower sandability; the paint film formed by the one-component aqueous anionic resin sealing primer in Comparative Example 2, although the hardness and sandability were up to the standard, but with poor blocking performance of tannins and grease.

EMBODIMENTS

Embodiment 1: A two-component aqueous sealing primer for wood, comprising: Component A: a film-forming resin composition comprising at least one aqueous emulsion of cationic resin and optionally at least one additional additive; and Component B: a curing agent composition comprising at least one polyisocyanate.

Embodiment 2: An embodiment of Embodiment 1, wherein the weight ratio of Component A to Component B is in the range of 100:5 to 100:15.

Embodiment 3: An embodiment of any of Embodiments 1-2, wherein the at least one aqueous emulsion of cationic resin comprises at least one acrylic resin, at least one polyurethane acrylate (PUA), at least one polyurethane resin, at least one epoxy resin, or combination thereof.

Embodiment 4: An embodiment of any of Embodiments 1-3, wherein based on the total weight of the film-forming resin composition, the film-forming resin composition comprises: 50-90 wt % of the at least one aqueous emulsion of cationic resin; 2-10 wt % of at least one coalescent; 2-20 wt % of at least one aqueous solvent; 0-10 wt % of at least one filler; and 0-10 wt % of the at least one additional additive, wherein the at least one additional additive comprises thickener, wetting agent, leveling agent, defoamer, dispersing agent, pH-adjusting agent, antiseptics, preservatives, or any combinations thereof.

Embodiment 5: An embodiment of any of Embodiments 1-4, wherein the curing agent composition comprises at least one non-ionic waterborne polyisocyanate.

Embodiment 6: An embodiment of Embodiment 5, wherein the at least one non-ionic waterborne polyisocyanate comprises an aliphatic polyisocyanate.

Embodiment 7: An embodiment of any of Embodiments 5-6, wherein the at least one non-ionic waterborne polyisocyanate comprises a non-ionic group derived from polyether.

Embodiment 8: An embodiment of Embodiment 7, wherein the polyether comprises polyethylene glycol monoether, monoether of copolymer of polyethylene and polypropylene glycol, or any combination thereof, preferably the polyether comprises polyethylene glycol monomethyl ether, polyethylene glycol monoethyl ether, polyethylene glycol monobutyl ether, poly(ethylene glycol-propylene glycol) monobutyl ether, or any combination thereof.

Embodiment 9: An embodiment of Embodiment 8, wherein the polyether comprises polyethylene glycol monomethyl ether containing on average 5-10 ethyleneoxy ($—CH_2CH_2—O—$) units.

Embodiment 10: An embodiment of any of Embodiments 1-9, wherein the curing agent composition comprises at least one solvent-based polyisocyanate and at least one co-solvent.

Embodiment 11: An embodiment of Embodiment 10, wherein the at least one solvent-based polyisocyanate comprises an aliphatic polyisocyanate.

Embodiment 12: An embodiment of Embodiment 10, wherein the co-solvent comprises propylene glycol methyl ether acetate (PMA), propylene glycol diacetate (PGDA), methyl isobutyl ketone (MIBK), or any combination thereof.

Embodiment 13: An embodiment of any of Embodiments 1-12, wherein the curing agent composition comprises at least one non-ionic waterborne polyisocyanate, at least one solvent-based polyisocyanate and at least one co-solvent.

Embodiment 14: An embodiment of Embodiment 13, wherein the at least one non-ionic waterborne polyisocyanate and the at least one solvent-based polyisocyanate have a weight ratio in the range of 9:1 to 1:9.

Embodiment 15: An embodiment of Embodiment 13, wherein based on the total weight of the curing agent composition, the curing agent composition comprises: 30-99.99 wt % of the at least one non-ionic waterborne polyisocyanate; 0.01-50 wt % of the at least one solvent-based polyisocyanate; and 0-20 wt % of the at least one co-solvent.

Embodiment 16: An embodiment of any of Embodiments 1-15, wherein the two-component aqueous sealing primer for wood has a volatile organic compounds (VOC) of no greater than 600 g/L.

Embodiment 17: A sealing coating formed by the two-component aqueous sealing primer for wood according to any one of Embodiments 1-16.

Embodiment 18: An article comprising: a wood substrate having at least one major surface; and the sealing coating according to Embodiment 17 formed on at least one part of the major surface.

While what has been described with respect to a number of embodiments and examples, those skilled in the art, having benefit of this disclosure, will appreciate that other embodiments can be devised which do not depart from the scope and spirit of what is disclosed herein.

The invention claimed is:

1. A two-component aqueous sealing primer for wood, comprising:

Component A: a film-forming resin composition comprising an aqueous emulsion of cationic resin in an amount of 55-90 wt % of the film-forming resin composition, wherein the film-forming resin optionally comprises at least one additional additive; and Component B: a curing agent composition comprising at least one polyisocyanate;

wherein the at least one polyisocyanate is hydrophilically modified by (1) non-ionic hydrophilic modification using hydroxyalkyl ethers of hydrophilic polyether polyols; (2) ionic modification by introducing anionic or cationic groups into its molecules; or (3) mixed modification with both (1) and (2).

2. The two-component aqueous sealing primer for wood according to claim 1, wherein the weight ratio of Component A to Component B is in the range of 100:5 to 100:15.

3. The two-component aqueous sealing primer for wood according to claim 1, wherein the aqueous emulsion of cationic resin further comprises an acrylic resin, a polyurethane acrylate (PUA), a polyurethane resin, or an epoxy resin.

4. The two-component aqueous sealing primer for wood according to claim 1, wherein based on the total weight of the film-forming resin composition, the film-forming resin composition comprises:

60-90 wt % of the aqueous emulsion of cationic resin;

2-10 wt % of at least one coalescent;

2-20 wt % of at least one aqueous solvent;

0-10 wt % of at least one filler; and 0-10 wt % of the at least one additional additive, wherein the at least one additional additive comprises thickener, wetting agent, leveling agent, defoamer, dispersing agent, pH-adjusting agent, antiseptics, preservatives, or any combinations thereof.

5. The two-component aqueous sealing primer for wood according to claim 1, wherein the aqueous emulsion of cationic resin is in an amount of 60-90 wt % of the film-forming resin composition.

6. The two-component aqueous sealing primer for wood according to claim 1, wherein the at least one polyisocyanate is hydrophilically modified by non-ionic hydrophilic modification using hydroxyalkyl ethers of hydrophilic polyether polyols.

7. The two-component aqueous sealing primer for wood according to claim 6, wherein the at least one polyisocyanate hydrophilically modified by non-ionic hydrophilic modification using hydroxyalkyl ethers of hydrophilic polyether polyols comprises an aliphatic polyisocyanate.

8. The two-component aqueous sealing primer for wood according to claim 6, wherein the hydroxyalkyl ethers of hydrophilic polyether polyols are selected from the group consisting of: polyethylene glycol monoether; a monoether of a copolymer of polyethylene and polypropylene glycol; and combinations thereof.

9. The two-component aqueous sealing primer for wood according to claim 8, wherein the hydroxyalkyl ethers of hydrophilic polyether polyols comprise polyethylene glycol monoether containing on average 5-10 ethyleneoxy ($-CH_2CH_2-O-$) units.

10. The two-component aqueous sealing primer for wood according to claim 8, wherein the hydroxyalkyl ethers of hydrophilic polyether polyols comprise polyethylene glycol monomethyl ether, polyethylene glycol monoethyl ether, polyethylene glycol monobutyl ether, poly(ethylene glycol-propylene glycol) monobutyl ether, or any combination thereof.

11. The two-component aqueous sealing primer for wood according to claim 1, wherein the curing agent composition further comprises at least one solvent-based polyisocyanate and at least one co-solvent.

12. The two-component aqueous sealing primer for wood according to claim 11, wherein the at least one solvent-based polyisocyanate comprises an aliphatic polyisocyanate.

13. The two-component aqueous sealing primer for wood according to claim 11, wherein the co-solvent comprises propylene glycol methyl ether acetate (PMA), propylene glycol diacetate (PGDA), methyl isobutyl ketone (MIBK), or any combination thereof.

14. The two-component aqueous sealing primer for wood according to claim 1, wherein the curing agent composition comprises the at least one polyisocyanate hydrophilically modified by non-ionic hydrophilic modification using hydroxyalkyl ethers of hydrophilic polyether polyols, and further comprises at least one solvent-based polyisocyanate and at least one co-solvent.

15. The two-component aqueous sealing primer for wood according to claim 14, wherein the at least one polyisocyanate hydrophilically modified by non-ionic hydrophilic modification using hydroxyalkyl ethers of hydrophilic polyether polyols and the at least one solvent-based polyisocyanate have a weight ratio in the range of 9:1 to 1:9.

16. The two-component aqueous sealing primer for wood according to claim 14, wherein based on the total weight of the curing agent composition, the curing agent composition comprises:

30-99.99 wt % of the at least one polyisocyanate hydrophilically modified by non-ionic hydrophilic modification using hydroxyalkyl ethers of hydrophilic polyether polyols;

0.01-50 wt % of the at least one solvent-based polyisocyanate; and 0-20 wt % of the at least one co-solvent.

17. The two-component aqueous sealing primer for wood according to claim 1, wherein the two-component aqueous sealing primer for wood has a volatile organic compounds (VOC) of no greater than 600 g/L.

18. A sealing coating formed by the two-component aqueous sealing primer for wood according to claim 1.

19. An article comprising:

a wood substrate having at least one major surface; and the sealing coating according to claim 18 formed on at least one part of the major surface.

* * * * *